United States Patent [19]
Sola et al.

[11] Patent Number: 5,848,480
[45] Date of Patent: Dec. 15, 1998

[54] RECONFIGURABLE SUPPORTING FIXTURE, PARTICULARLY FOR A MEASURING MACHINE

[75] Inventors: Domenico Sola, Rivalta; Enrico Garau, Turin, both of Italy

[73] Assignee: Brown & Sharpe Dea SpA, Italy

[21] Appl. No.: 726,658

[22] Filed: Oct. 7, 1996

[30] Foreign Application Priority Data

Oct. 6, 1995 [IT] Italy ................................. T095A0850

[51] Int. Cl.⁶ ................................................. B23Q 16/00
[52] U.S. Cl. ................................. 33/573; 33/568; 33/503
[58] Field of Search ........................... 33/573, 503, 549, 33/568, DIG. 1, DIG. 2; 269/9, 24, 45, 71, 309, 311, 900

[56] References Cited

U.S. PATENT DOCUMENTS

| | | | |
|---|---|---|---|
| 4,848,005 | 7/1989 | Ercole et al. | 33/573 |
| 5,012,586 | 5/1991 | Ashworth | 33/DIG. 1 |
| 5,058,433 | 10/1991 | Wilson et al. | 33/573 |
| 5,107,599 | 4/1992 | Marincic et al. | 33/573 |
| 5,625,959 | 5/1997 | Ercole et al. | 33/573 |

FOREIGN PATENT DOCUMENTS 2167559  5/1986  United Kingdom .

*Primary Examiner*—Christopher W. Fulton
*Attorney, Agent, or Firm*—Hall, Priddy & Myers

[57] ABSTRACT

A fixture for positioning and supporting parts for measurement on a measuring machine, the fixture presenting a number of reconfigurable supporting elements, each presenting a first portion positionable on a reference surface of the measuring machine, a second portion positionable in relation to the first portion in a direction perpendicular to the reference surface, and clamping members for clamping the first portion in relation to the reference surface and the second portion in relation to the first portion; and a gripping tool movable automatically by the measuring machine and cooperating with the second portion of a supporting element in a position of mutual engagement to set the supporting element in a predetermined position; the gripping tool presenting control means, which, in the aforementioned position of mutual engagement, provide for simultaneously releasing the clamping members clamping the first portion and second portion of the supporting element to enable the supporting element to be repositioned by means of a single gripping operation.

19 Claims, 5 Drawing Sheets

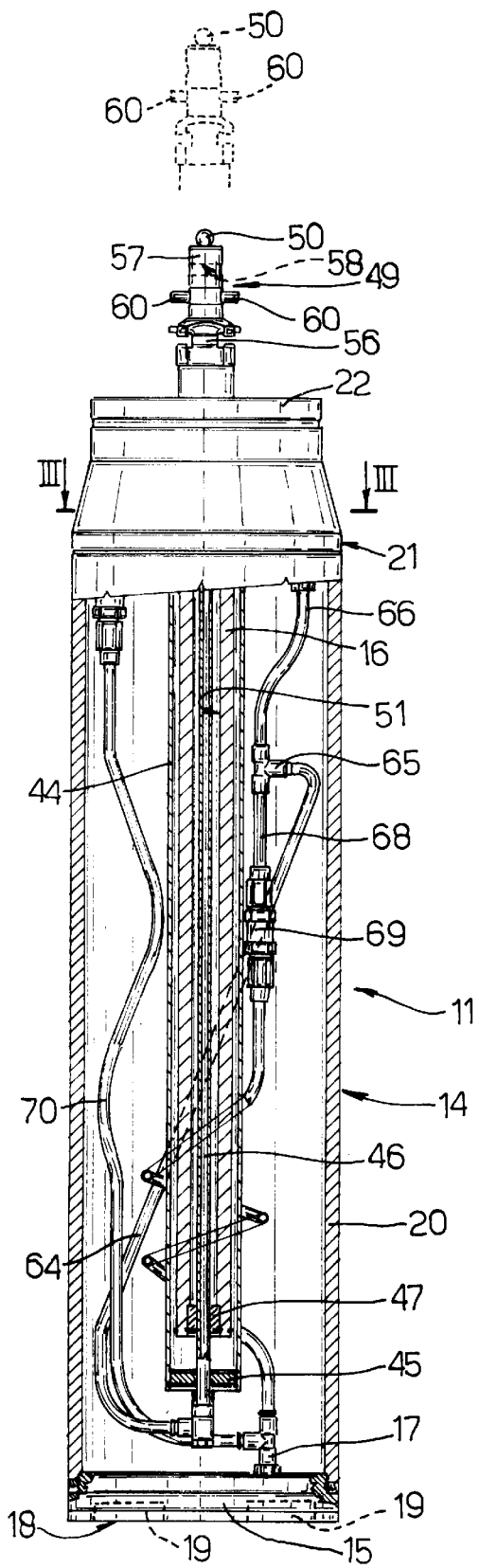
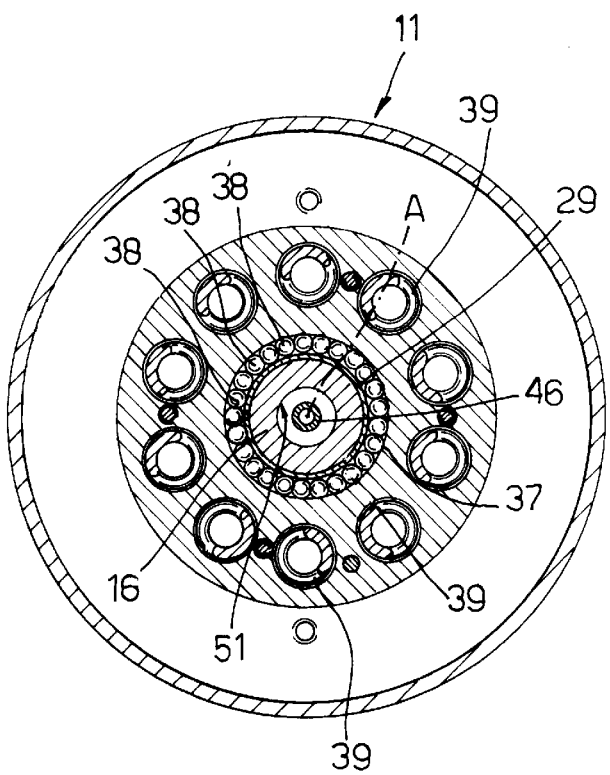
Fig.2
Fig.3

RECONFIGURABLE SUPPORTING FIXTURE, PARTICULARLY FOR A MEASURING MACHINE

BACKGROUND OF THE INVENTION

The present invention relates to a reconfigurable fixture for supporting and positioning parts, particularly, but not exclusively, parts for measurement on a measuring machine.

In the following description, reference is made to the above application purely for the sake of simplicity and by way of example.

As is known, parts for measurement are positioned and secured to the bed of the measuring machine by means of supporting fixtures. These are normally special-purpose types and, particularly when dealing with nonrigid parts deformable under their own weight, such as certain automotive body parts, are relatively complex and expensive by having to reproduce the on-vehicle conditions of the part in question.

By way of an alternative to conventional special-purpose fixtures, to reduce retooling costs for measuring different parts, reconfigurable fixtures have been proposed, as described, for example, in Italian Patent n. 1.206.886 filed by the present Applicant.

Such fixtures substantially comprise a number of column type supporting elements in turn substantially comprising a body secured, e.g. by means of magnetic clamps, in a predetermined position on the reference surface of the machine, and a rod adjustable in height along an axis perpendicular to the reference surface. Both positioning of the body on the reference surface and the height adjustment of the rod are performed automatically by the measuring machine itself, the head of which is equipped with a gripping tool cooperating with the supporting elements.

More specifically, the gripping tool cooperates with the body of each supporting element to release and reposition it on the reference surface, and cooperates with the rod of the supporting element to release it in relation to the body and adjust it in height.

As such, each supporting element is substantially reconfigured in two stages (repositioning of the body and height adjustment of the rod), so that the machine is called upon to perform a relatively long, complex cycle, and more specifically, to move the gripping tool successively into two different gripping positions in relation to the supporting element. Reconfiguring the whole fixture, which may comprise a relatively large number of reconfigurable supporting elements, is therefore a long, painstaking job. Moreover, since the body is already clamped to the reference surface when the height of the rod is adjusted, any construction errors due to machining or assembly tolerances of the supporting element (e.g. the rod axis not perfectly perpendicular to the base of the body) must be compensated to avoid positioning errors.

SUMMARY OF THE INVENTION

It is an object of the present invention to provide a reconfigurable fixture, particularly for a measuring machine, designed to eliminate the aforementioned drawbacks typically associated with known fixtures.

According to the present invention, there is provided a reconfigurable fixture for positioning and supporting parts on a machine comprising a reference surface and a movable unit, particularly a measuring machine; said fixture comprising:

at least one reconfigurable supporting element comprising a first portion positionable on said reference surface, first clamping means for clamping said first portion in relation to said reference surface, first release means for releasing said first clamping means, a second portion positionable in relation to said first portion in a direction perpendicular to said reference surface, second clamping means for clamping said second portion in relation to said first portion, and second release means for releasing said second clamping means; and a gripping tool movable by said movable unit and presenting connecting means cooperating with said supporting element in a position of mutual engagement;

characterized in that said gripping tool comprises control means for controlling said first and second release means and which are operable in said position of mutual engagement with said supporting element.

BRIEF DESCRIPTION OF THE DRAWINGS

A preferred, non-limiting embodiment of the present invention will be described by way of example with reference to the accompanying drawings, in which:

FIG. 2 shows a side view of a supporting element of the FIG. 1 fixture;

FIG. 3 shows a larger-scale section along line III—III in FIG. 2;

DETAILED DESCRIPTION OF THE INVENTION

Figure 1:
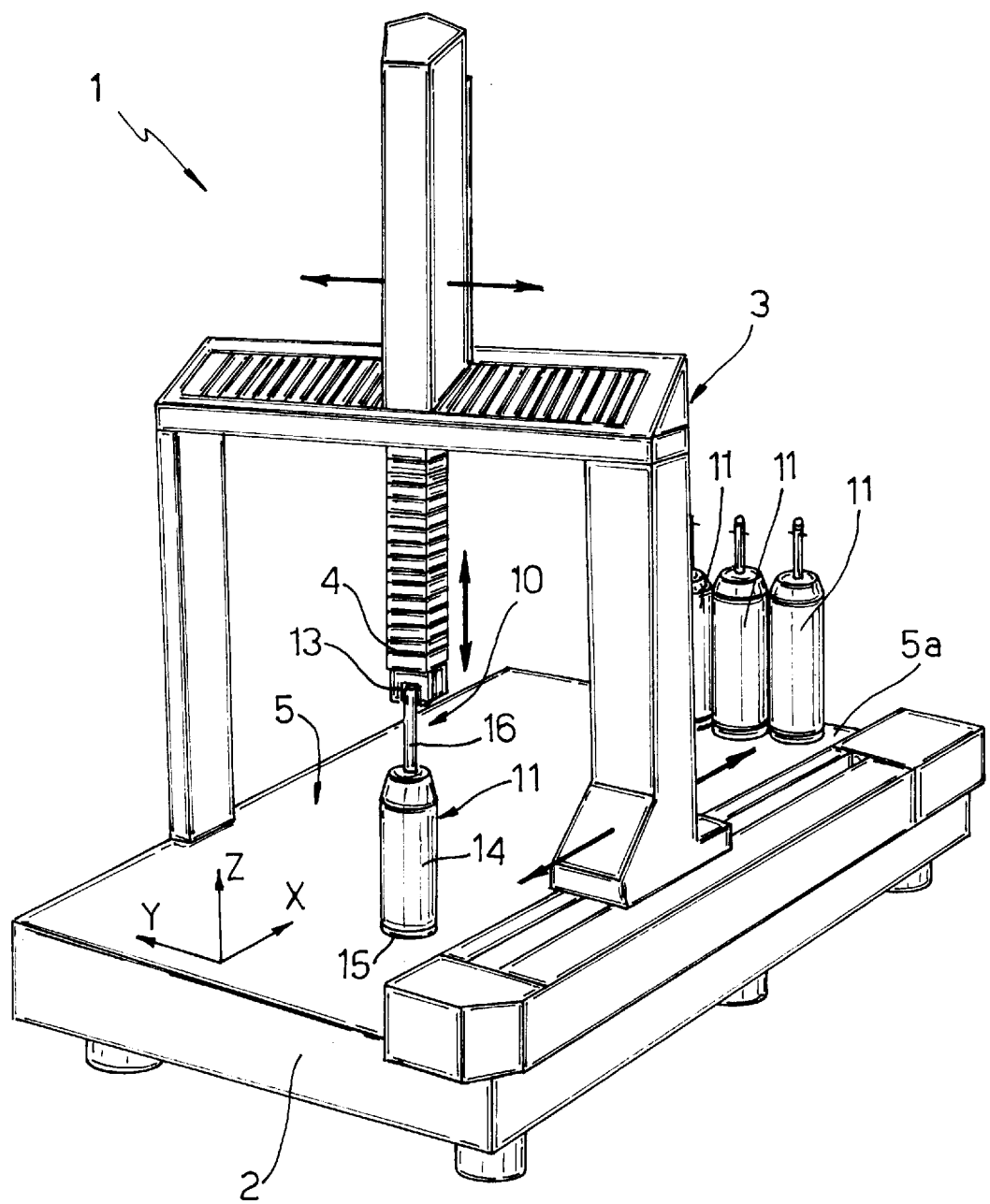
FIG. 1 shows a view in perspective of a measuring machine featuring a reconfigurable fixture in accordance with the teachings of the present invention.

Number 1 in FIG. 1 indicates a known measuring machine comprising a bed 2 and a movable, e.g. gantry type, measuring unit 3.

Unit 3 presents a measuring head 4, which is movable by unit 3 along three coordinate axes X, Y, Z. More specifically, the X and Y axes are horizontal and perpendicular to each other, and define an X,Y reference plane coincident with the flat upper surface 5 of bed 2; the Z axis is vertical and therefore perpendicular to the X,Y plane; and bed 2 is made of ferromagnetic material.

Machine 1 also comprises a processing and control unit (not shown) connected to unit 3 and for controlling displacement of the movable members of unit 3 along the coordinate axes and according to programmable operating cycles.

According to the present invention, machine 1 presents a reconfigurable fixture 10 for supporting parts for measurement.

Fixture 10 comprises a number of column type supporting elements 11 (hereinafter simply referred to as "columns"), which are adjustable in height and placed in predetermined positions on bed 2; a number of supporting tools (not shown), which are fitted to each column 11 to support, locate and/or clamp the part for measurement; and a gripping tool 13, which is fitted to measuring head 4 and cooperates with columns 11 at the column configuration stage as described later on.

Figure 4:
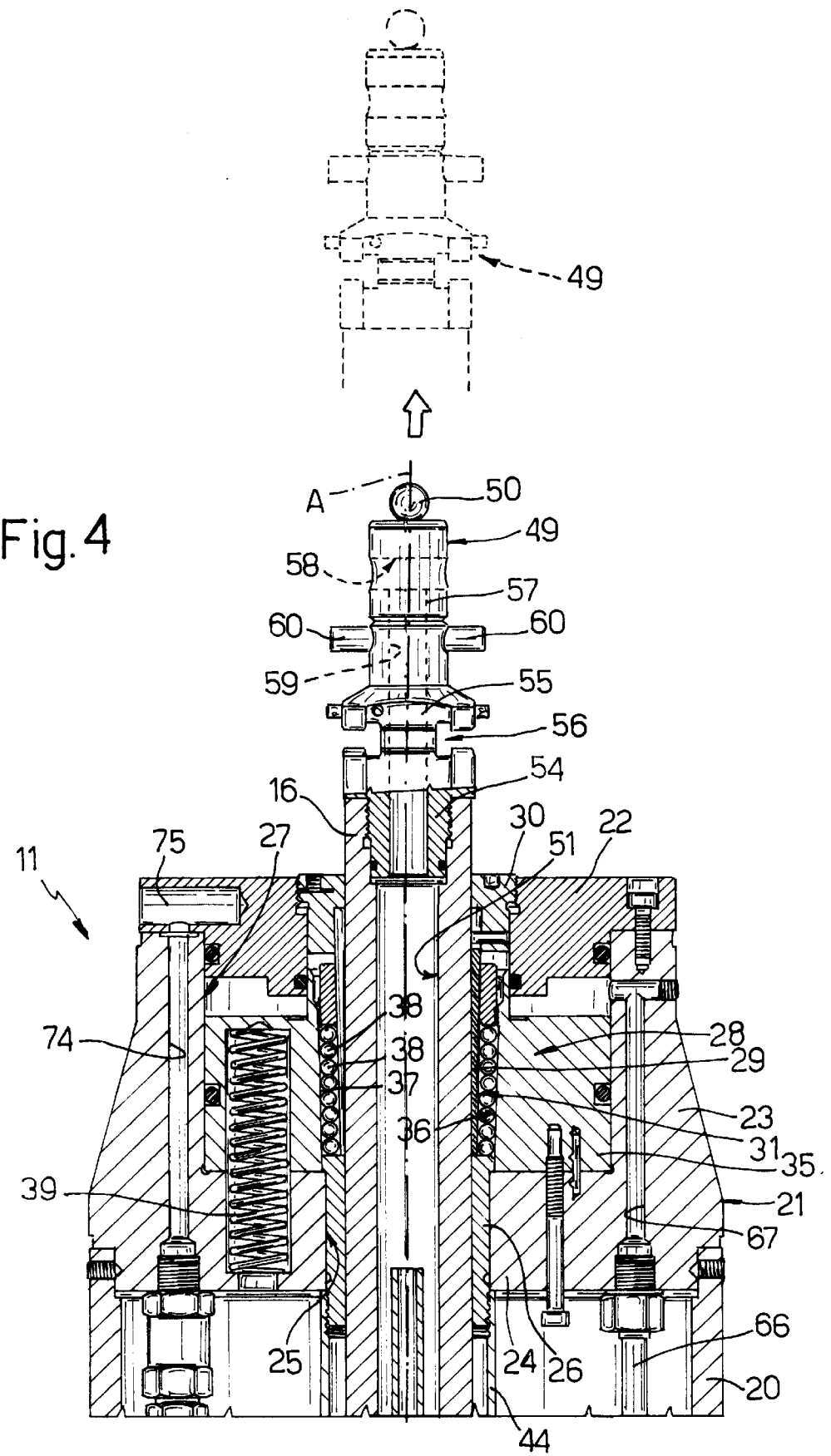
FIG. 4 shows a larger-scale partial axial section of the FIG. 2 element.

FIGS. 2, 3 and 4 show one of columns 11, which are all identical to one another.

Column 11 comprises a hollow, substantially cylindrical body 14; an air-cushioned pad 15 defining a supporting base by which to slide body 14 over bed 2; and a tubular rod 16 presenting a vertical axis A, and housed partially and supported in axially-sliding manner inside body 14 to adjust the overall height of column 11.

Pad 15 (FIG. 2) presents in known manner a compressed air supply fitting 17; a number of internal channels (not shown) for feeding the air to a number of nozzles (not shown) terminating in the bottom face 18 of pad 15 facing reference surface 5 and for forming, in use, a fluid passage for supporting column 11; and a number of permanent magnets 19 facing and cooperating magnetically with bed 2 to clamp pad 15 in the absence of air supply to the pad.

Body 14 substantially comprises a cylindrical liner 20 fitted to pad 15; a substantially cup-shaped top portion 21 fitted to the top end of liner 20; and a top end head 22.

Top portion 21 presents a lateral wall 23; and a transverse bottom wall 24 with an axial hole 25 housing a bush 26 for radially supporting rod 16, which is free to slide axially inside bush 26.

Top portion 21 and head 22 define an annular chamber 27 housing a device 28 for axially clamping rod 16.

Device 28 substantially comprises an elastic bush 29, which is cut along a generating line, is fitted on to rod 16, is locked axially between bush 26 and a ring nut 30 screwed inside head 22, and presents a conical outer surface 31 decreasing downwards in diameter.

Device 28 also comprises a member for gripping bush 29 and comprising a pneumatic annular piston 35, which slides in airtight manner inside lateral wall 23 of top portion 21, is externally coaxial with bush 29, and presents a conical, upwardly-flaring axial cavity 36 defined by an inner surface 37 coaxial with outer surface 31 of bush 29; and a number of balls 38 arranged in superimposed rings are interposed between surfaces 31 and 37.

Piston 35 is pushed upwards by a number of coil springs 39 compressed between wall 24 and piston 35 to maintain a minimum radial clearance between surfaces 31 and 37.

A cylindrical tube 44 is fitted to bush 26, extends downwards, coaxially with and outside rod 16, almost up to pad 15, and is closed at the bottom end by a disk 45 axially supporting a small-diameter tube 46, which extends inside an inner cavity 51 of rod 16 up to bush 26. Rod 16 is closed at the bottom end by a plug 47 through which tube 46 is fitted in airtight manner.

Column 11 also comprises an endpiece 49 fitted to the top end of rod 16, presenting a ball 50 at the top, and which comprises an externally-threaded bottom connecting portion 54 screwed into rod 16, an intermediate portion 55 with connections 56 for a supporting element (not shown) for supporting the part for measurement, and a substantially cylindrical top portion 57 fitted with ball 50.

Top portion 57 presents a diametrical hole 58 (for the purpose explained later on) communicating with an axial cavity 59 of endpiece 49; cavity 59 extends up to connecting portion 54 and communicates with the inside of rod 16 and, hence, tube 46; and portion 57 presents a pair of coaxial, diametrically-opposite radial appendixes 60.

The bottom end of tube 46 is connected to a hose 64 in turn connected to a first way of a T fitting 65; a second way of fitting 65 is connected by a hose 66 to a channel 67 formed inside portion 21 of body 14 and communicating with an upper portion of chamber 27 located between head 22 and piston 35; a third way of fitting 65 is connected by a hose 68, in series with a nonreturn valve 69, to fitting 17 of air-cushioned pad 15; and fitting 17 is connected by a further hose 70 to a channel 74 formed inside portion 21 of body 14 and communicating with an inlet 75 formed in head 22.

FIGS. 5 to 10 show gripping tool 13.

Figure 8:
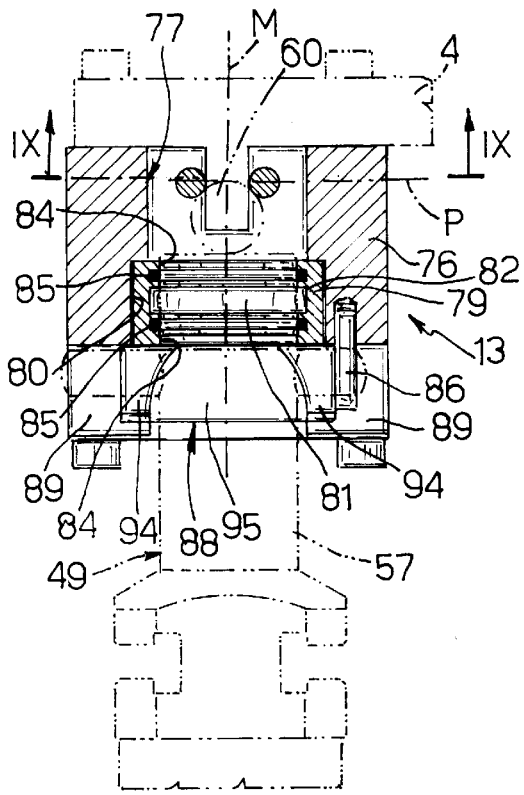
FIG. 8 shows a section along line VIII—VIII in FIG. 6.
Figure 9:
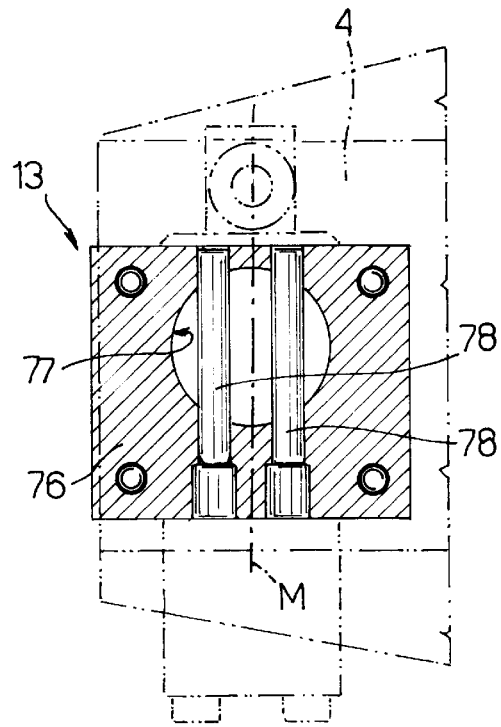
FIG. 9 shows a section along line IX—IX in FIG. 8.
Figure 10:
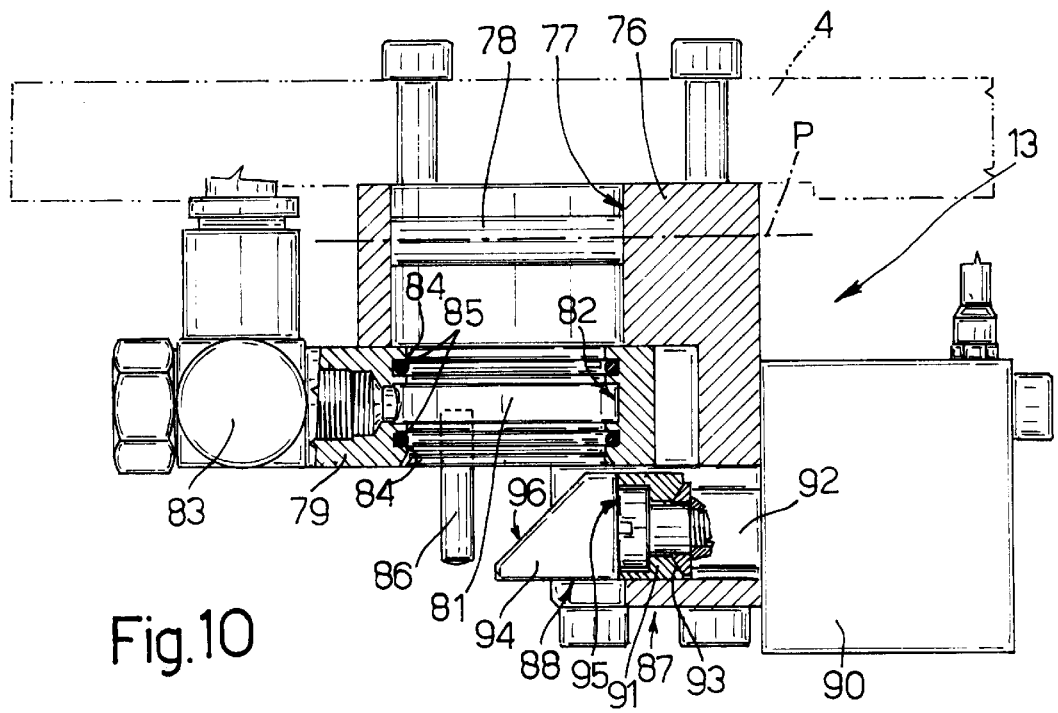
FIG. 10 shows a section along line X—X in FIG. 6.

Tool 13 substantially comprises a supporting body 76, which is fitted to head 4 of the measuring machine and presents a vertical through cavity 77 fitted inside with two parallel pins 78 with their axes lying in a horizontal plane P and symmetrical in relation to the mid longitudinal plane M of body 76. Pins 78 are separated by a distance smaller than the diameter of ball 50 of endpiece 49 so as to cooperate with ball 50 and define a vertical and lateral stop (FIG. 8).

Tool 13 also comprises a supply block 79 fitted inside a housing 80 in body 76 and presenting a vertical, substantially cylindrical through cavity 81 coaxial with cavity 77 of body 76. Cavity 81 presents a large-diameter intermediate portion 82 communicating with a supply fitting 83 connectable to an external compressed air source; and a pair of small-diameter end portions 84 housing respective annular seals 85 cooperating in sealing manner with top portion 57 of endpiece 49 of column 11.

From a front portion of body 76, two vertical cylindrical pins 86 extend downwards on either side of block 79 to define respective stops for radial appendixes 60 of portion 57 of endpiece 49.

Tool 13 also comprises a gripping device 87, which cooperates with endpiece 49 of column 11 in a given geometrical position of mutual engagement. Device 87 substantially comprises a substantially U-shaped jaw 88, which slides along lateral guides 89 beneath body 76 in a direction parallel to the axes of pins 78; and a single-acting pneumatic cylinder 90 fitted to the rear of body 76 and for operating jaw 88. Jaw 88 presents a central portion 91 secured to the rod 92 of cylinder 90 by a spherical support 93 permitting a small amount of relative inclination; and two lateral arms 94 extending towards pins 86, defining a cavity 95, and in turn defined at the front by respective coplanar flat surfaces 96 sloping downwards at an angle of 45° towards the free ends of arms 94.

The air supply to fitting 83 and cylinder 90 is controlled by valve means (not shown) operated by the control unit of the measuring machine.

Fixture 10 operates as follows.

At the start of the reconfiguration cycle of fixture 10, columns 11 are conveniently located at a peripheral portion 5a of the reference surface, in a predetermined position memorized in the control unit.

More specifically, each column 11 is clamped on to the reference surface by permanent magnets 19; rod 16 is locked in relation to body 14 by device 28; in the absence of air supply, springs 39 keep piston 35 raised; and, due to the taper of surfaces 31 and 37, balls 38 exert radial pressure on elastic bush 29 to grip it on to rod 16 and so prevent any axial movement or rotation of the rod.

Columns 11 are then picked up successively and repositioned by movable unit 3 of machine 1, which, for each column 11, performs the following operating sequence.

Figure 5:
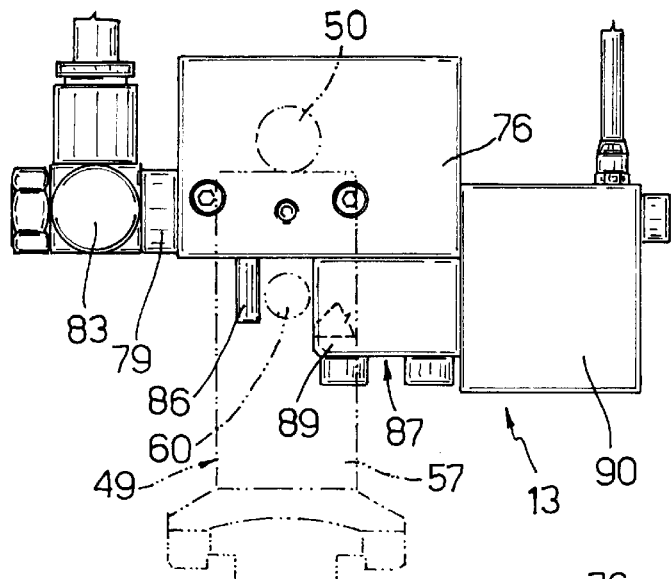
FIG. 5 shows a side view of a gripping tool forming part of the fixture according to the present invention and in a first operating position.
Figure 6:
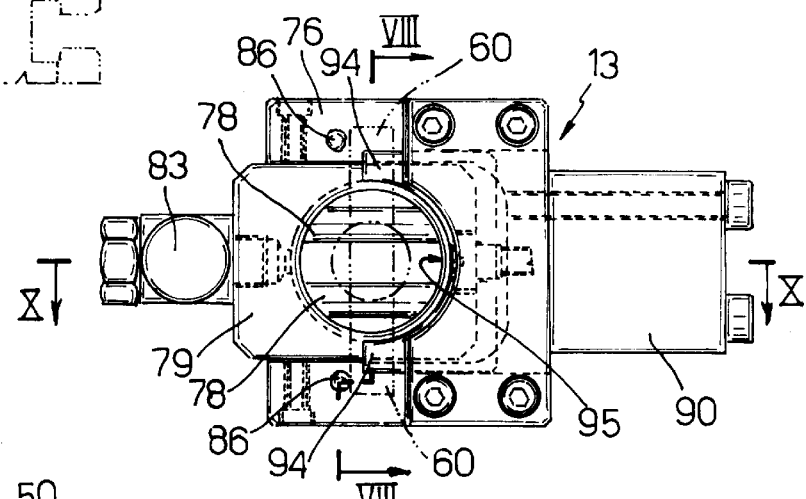
FIG. 6 shows a bottom plan view of the FIG. 5 tool in a second operating position.
Figure 7:
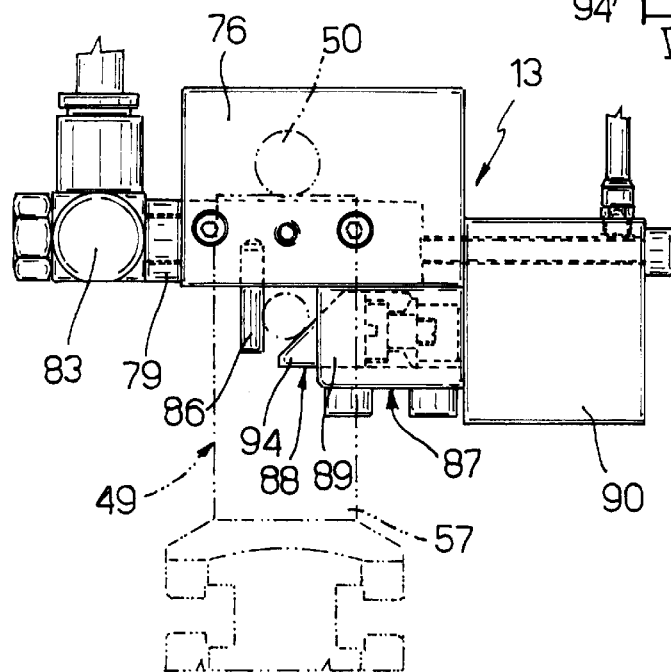
FIG. 7 shows a side view of the FIG. 5 gripping tool in the second operating position.

Gripping tool 13 is moved by measuring head 4 so as to cooperate with endpiece 49 of the column 11 to be positioned. More specifically, gripping tool 13 is positioned substantially over the vertical axis of endpiece 49, so that the plane defined by the axes of pins 86 is parallel to the axis of appendixes 60 of top portion 57; the gripping tool is lowered on to portion 57 so that ball 50 is positioned close to pins 78; portion 57 engages cavity 81 of supply block 79 and cooperates in airtight manner with seals 85, so that hole 58 of portion 57 communicates with intermediate portion 82 of cavity 81; and, at the same time, radial appendixes 60 are positioned between pins 86 and jaw 88, which is in the withdrawn position (FIG. 5).

At this point, the control unit activates the air supply to block 79, so that compressed air is fed through hole 58 and cavity 59 in endpiece 49 and along rod 16 to inner tube 46, and from this to air-cushioned pad 15 and clamping device 28.

The lift of the air cushion generated by pad 15 overcomes the force of magnets 19 and so releases column 11 from reference surface 5; and, at the same time, the compressed air forces piston 35 downwards, in opposition to springs 39, so as to release elastic bush 29 from the radial grip exerted by balls 38.

As such, rod 16 is free to move axially, and is raised by the resultant of the pressure forces acting on it. In particular, the useful upward thrust is defined by the area of the cross section of inner cavity 51 of rod 16, while the downward thrust acting on plug 47 is defined by the area of the circular gap between rod 16 and inner tube 46, and is therefore less. Rod 16 is arrested in the axial position defined by ball 50 of endpiece 49 contacting pins 78, which contact provides for eliminating two degrees of translatory freedom (vertical and transverse) of endpiece 49 in relation to tool 13.

At this point, the control unit activates air supply to cylinder 90, so that jaw 88 is pushed against appendixes 60 and exerts on them, by virtue of inclined surfaces 96, a force comprising two components: a horizontal component for maintaining appendixes 60 against respective pins 86; and a vertical component for maintaining contact between ball 50 and pins 78. This therefore provides for eliminating both the last degree of translatory freedom of column 11 (parallel to the axes of pins 78) and the only degree of rotational freedom (about the vertical axis).

Endpiece 49 is thus locked in relation to gripping tool 13 in a definite predetermined position of mutual engagement, and is able to follow tool 13 as it is moved by head 4 into the memorized position corresponding to the new position of column 11. As tool 13 is moved into position, column 11 travels over reference surface 5 into the new position (X, Y) with no appreciable resistance, thanks to air-cushioned pad 15, and rod 16 is free to slide axially in relation to body 14 into the required Z axis position. The above movement is effected with a minimum exchange of forces between tool 13 and column 11, thus minimizing positioning errors as a result of elastic deformation or vibration.

On the new position being reached, air supply to block 79 is cut off to simultaneously clamp pad 15 on to reference surface 5 and rod 16 in relation to body 14 of column 11; and air supply to cylinder 90 is also cut off to release tool 13 from column 11 and position the next column.

Inlet 75 provides for moving columns 11 manually over reference surface 5 when necessary, e.g. for placing or removing columns 11 on or off the reference surface. By connecting inlet 75 to a compressed air source, pad 15 is supplied by hose 70 to neutralize magnets 19, but clamping device 28 remains in the clamping position by nonreturn valve 69 preventing compressed air flow from pad 15 to chamber 27.

The advantages of fixture 10 according to the present invention will be clear from the foregoing description.

In particular, each column 11 is released and moved into the new position by means of a single gripping operation by tool 13, thus minimizing the time taken to reconfigure the fixture. Moreover, positioning accuracy is increased and compensatory measures eliminated by measuring head 4 setting endpiece 49 directly to the memorized new position, and being unaffected by construction errors due to machining or assembly tolerances of columns 11.

We claim:

1. A reconfigurable fixture (10) for positioning and supporting parts on a machine (1) comprising a reference surface (5) and a movable unit (3), particularly a measuring machine; said fixture (10) comprising:

at least one reconfigurable supporting element (11) comprising a first portion (14) positionable on said reference surface (5), first clamping means (19) for clamping said first portion (14) in relation to said reference surface (5), first release means (15) for releasing said first clamping means (19), a second portion (16, 49) positionable in relation to said first portion (14) in a direction (Z) perpendicular to said reference surface (5), second clamping means (28) for clamping said second portion (16, 49) in relation to said first portion (14), and second release means (35) for releasing said second clamping means (28); and a gripping tool (13) movable by said movable unit (3) and presenting connecting means (78, 86, 88) cooperating with said second portion of said reconfigurable support element in a position of mutual engagement;

gripping tool (13) comprising control means (79) for controlling both said first and second release means (15, 35) simultaneously, said control means being operable in said position of mutual engagement with said second portion of said reconfigurable supporting element.

2. A fixture as claimed in claim 1, characterized in that said second portion (49) of said supporting element (11) and said gripping tool (13) comprise respective mutual positioning means (50, 60; 78, 86) cooperating with each other to define said position of mutual engagement.

3. A fixture as claimed in claim 1, characterized in that said first and second release means (15, 35) are air-powered.

4. A fixture as claimed in claim 3, characterized in that said supporting element (11) comprises common air supply means (58, 59, 51, 46) for supplying air to said first and second release means (15, 35).

5. A fixture as claimed in claim 3, characterized in that said first release means comprise at least one air-cushioned pad (15).

6. A fixture as claimed in claim 5, characterized in that said first clamping means comprise at least one permanent magnet (19) cooperating with said reference surface (5).

7. A fixture as claimed in claim 3, characterized in that said first clamping means comprise releasable connecting means (29) for releasably connecting said second portion (16) of said supporting element (11) to said first portion (14); and elastic means (39) for maintaining said releasable connecting means (29) in the connected position.

8. A fixture as claimed in claim 7, characterized in that said second portion of said supporting element (11) comprises a rod (16) having an axis (A) parallel to said direction (Z) perpendicular to said reference surface (5) and supported in axially-sliding manner inside said first portion (14) of said supporting element (11).

9. A fixture as claimed in claim 8, characterized in that said releasable connecting means comprise an elastic bush (29) coaxial with said rod (16) and axially fixed in relation to said first portion (14) of said supporting element (11); a gripping member (35) for gripping said elastic bush (19) and externally coaxial with and sliding axially in relation to the elastic bush (19), said elastic bush (19) and said gripping member (35) presenting respective conical surfaces (31, 37) coaxial with each other; and a number of balls (38) interposed between said conical surfaces (31, 37); said elastic means (39) acting axially on said gripping member (35) to maintain the gripping member (35) in a position gripping said elastic bush (29).

10. A fixture as claimed in claim 9, characterized in that said second release means comprise a pneumatic actuator (27, 35) operating in opposition to said elastic means (39).

11. A fixture as claimed in claim 10, characterized in that said gripping member comprises a piston (35) of said pneumatic actuator (27, 35).

12. A fixture as claimed in claim 8, characterized by comprising lift means (51) for raising said rod (16) and which are operated pneumatically and simultaneously with said second release means (35).

13. A fixture as claimed in claim 12, characterized in that said lift means for raising said rod comprise an inner cavity (51) of the rod presenting different useful thrust sections and communicating with said common air supply means (58, 59, 46) for supplying air to said first and second release means (15, 35).

14. A fixture as claimed in claim 8, characterized in that said second portion of said supporting element comprises an endpiece (49) fitted to said rod (16); said endpiece (49) presenting said respective mutual positioning means (50, 60) in relation to said gripping tool (13), and an inlet (58) of said common air supply means (58, 59, 46).

15. A fixture as claimed in claim 14, characterized in that said cavity (51) of said rod (16) communicates with said inlet (58) of said endpiece (49); said common air supply means comprising an inner tube (46) coaxial with said rod (16), connected in sliding and airtight manner to the rod (16), and connecting said cavity (51) of said rod (16) to said air-cushioned pad (15) and to said pneumatic actuator (27, 35).

16. A fixture as claimed in claim 14, characterized in that said control means (79) of said gripping tool (13) comprise a cavity (81) connectable to air supply means (83) and connectable in sliding and airtight manner to said endpiece (49) of said supporting element (11) in said direction (Z) perpendicular to said reference surface to connect said inlet (58) to said air supply means (83).

17. A fixture as claimed in claim 15, characterized in that said mutual positioning means comprise a ball (50) on said endpiece (49); and a pair of first stop surfaces (78) fitted to said gripping tool (13) and cooperating with said ball (50) to define a stop in said direction (Z) perpendicular to said reference surface (5), and in a first direction parallel to said reference surface (5).

18. A fixture as claimed in claim 17, characterized in that said mutual positioning means comprise a pair of radial appendixes (60) on said endpiece (49); and a pair of second stop surfaces (86) fitted to said gripping tool (13) and cooperating with said appendixes (60) to define a stop in a second direction parallel to said reference surface (5) and perpendicular to said first direction.

19. A fixture as claimed in claim 18, characterized in that said connecting means comprise a jaw (88) movable in said second direction and presenting inclined contact surfaces (96) cooperating with said appendixes (60) of said endpiece (49) to simultaneously maintain said appendixes (60) in contact with said second stop surfaces (86) and said ball (50) in contact with said first stop surfaces (78).

* * * * *

UNITED STATES PATENT AND TRADEMARK OFFICE
CERTIFICATE OF CORRECTION

PATENT NO. : 5,848,480
DATED : Dec. 15, 1998
INVENTOR(S) : Domenico Sola et al

It is certified that error appears in the above-indentified patent and that said Letters Patent is hereby corrected as shown below:

On the title page, Foreign Application Priority Data, change --TO95A0850-- to --TO95A000805--.

Signed and Sealed this

Thirty-first Day of August, 1999

Attest:

Q. TODD DICKINSON

*Attesting Officer*     *Acting Commissioner of Patents and Trademarks*